Nov. 20, 1956 — D. M. STROMQUIST ET AL — 2,771,424
PROCESS FOR REGENERATING ION EXCHANGE MATERIAL
Filed Aug. 25, 1949 — 3 Sheets-Sheet 1

INVENTOR
Donald M. Stromquist
August C. Reents
Marvin E. Veerman
ATTORNEY

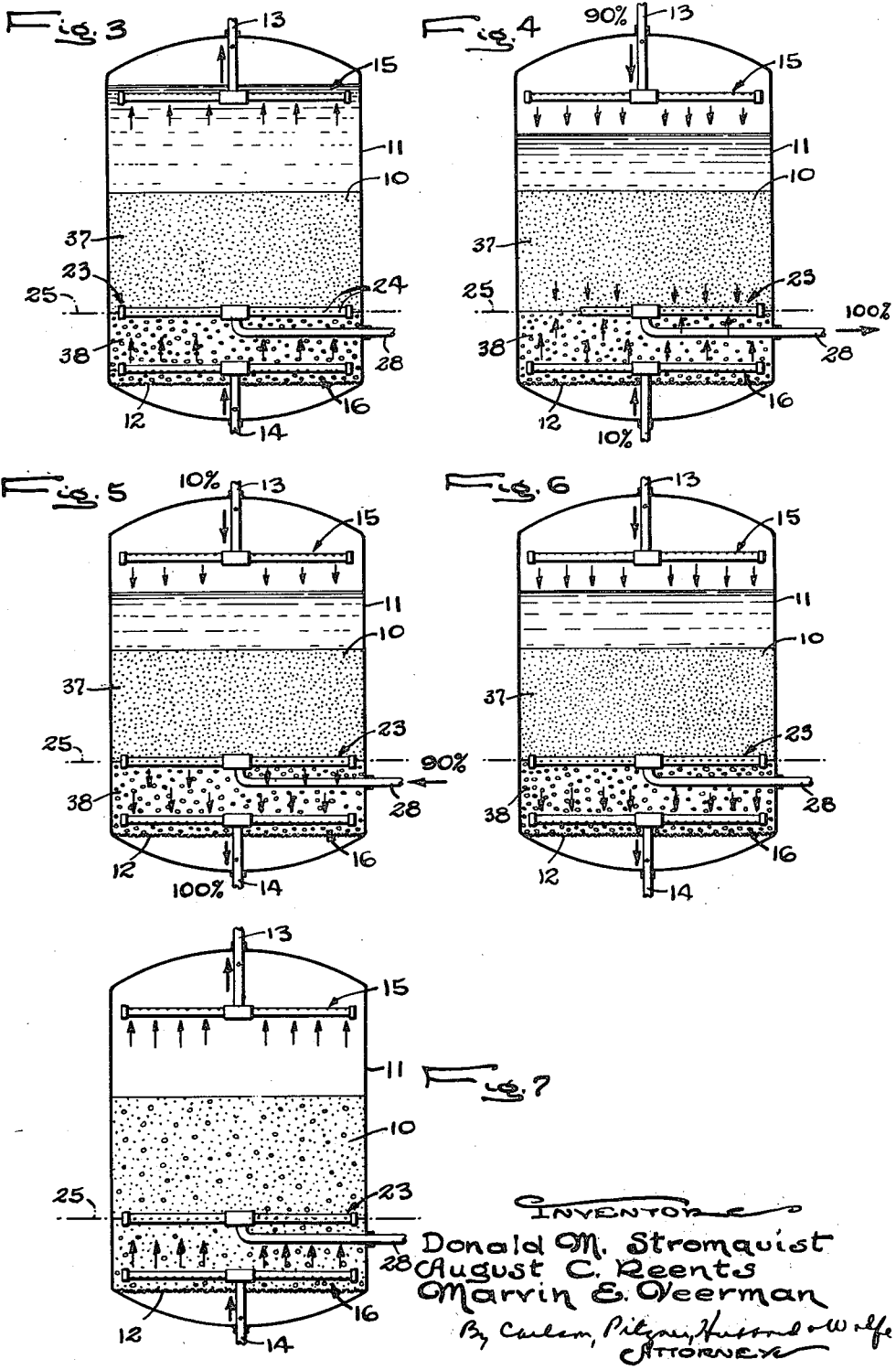

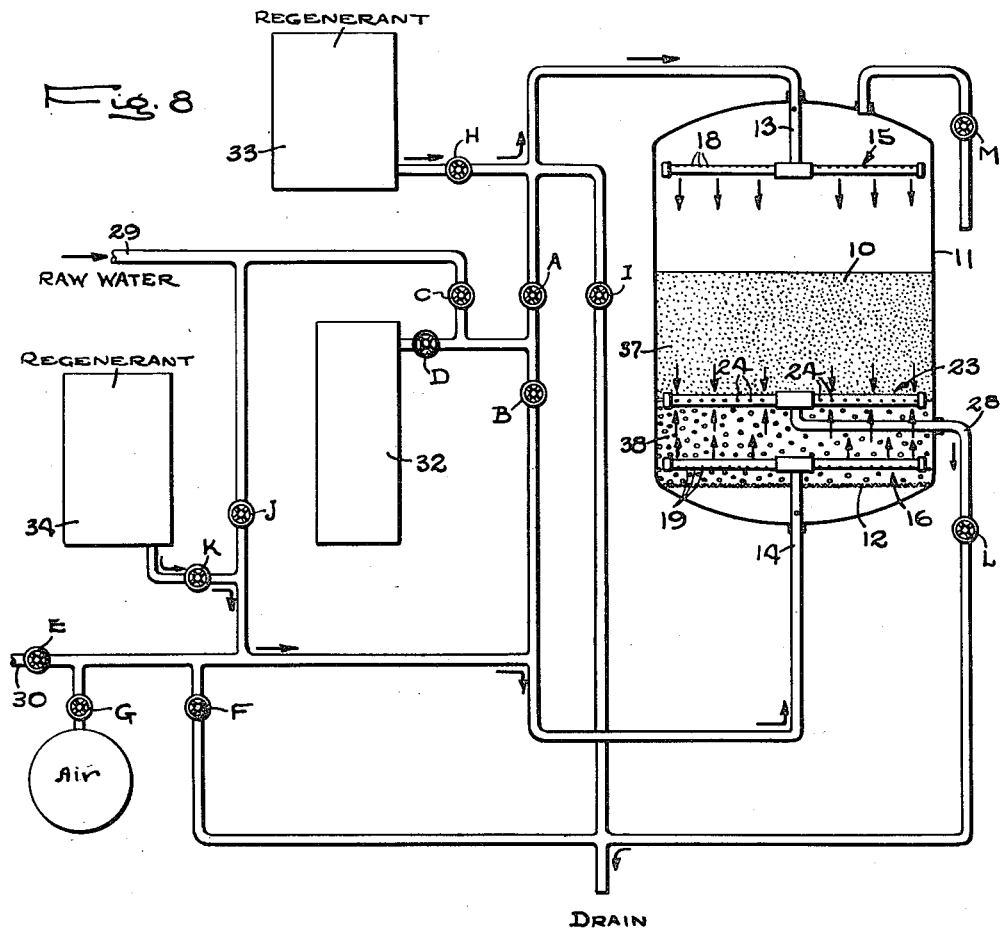

United States Patent Office 2,771,424
Patented Nov. 20, 1956

2,771,424

PROCESS FOR REGENERATING ION EXCHANGE MATERIAL

Donald M. Stromquist, August C. Reents, and Marvin E. Veerman, Rockford, Ill., assignors to Illinois Water Treatment Co., Rockford, Ill., a corporation of Illinois Application August 25, 1949, Serial No. 112,352

6 Claims. (Cl. 252—182)

This invention relates to the removal of both cations and anions from water or other liquid by contacting the same with two ion exchange materials intermixed with each other in a single bed. Such materials as commonly manufactured possess different densities and may thus be separated or stratified in the deionizing tank by hydraulic classification after which the separate superimposed layers may be regenerated in the tank by passing solutions, acid and alkali, for the different exchange materials through the respective columns.

The primary object of the present invention is to simplify the procedure, reduce the amount of equipment used, and shorten the time required for regenerating the cation and anion materials in a mixed bed deionizer by effecting the regeneration without removal of the exchange materials from the primary exchange tank.

Another object is to effect the regeneration of one of the stratified layers by passing the regenerating solution therefor through this layer and withdrawing the excess from between or near the inner ends of the two layers while at the same time maintaining the other or second layer submerged in a blocking liquid which prevents migration of the first regenerant into the material of the second layer.

A further object is to increase the effectiveness of the blocking action by moving the blocking liquid through one of the layers in opposition to the flow of regenerant in the other layer combined with the removal of the blocking liquid along with the excess regenerant from between the two stratified layers.

Still another object is to utilize as the blocking liquid during the regeneration of one of the layers by acid or alkali, a solution containing the regenerant for the other layer so that the anion and cation layers, although regenerated by solutions having opposite chemical characteristics, may nevertheless be reactivated simultaneously thus reducing the time and the number of steps involved in the regeneration and rinsing of the two materials.

The invention also resides in the novel manner of combining the excess of the regenerating and blocking liquids passed through the respective layers so that the regenerant comes into proper contact with all parts of the column it is adapted to regenerate but is prevented from migrating across the interface between the two layers and into different ion exchange material of the other layer.

Other objects and advantages of the invention will become apparent from the following detailed description taken in connection with the accompanying drawings, in which Figure 1 is a vertical cross-sectional view of an ion exchange apparatus embodying the novel features of the present invention, the associated valves being shown diagrammatically.

Figs. 3 through 7 illustrate successive steps in the regeneration process.

Fig. 8 is a view similar to Fig. 1 showing a modification.

Figure 1:
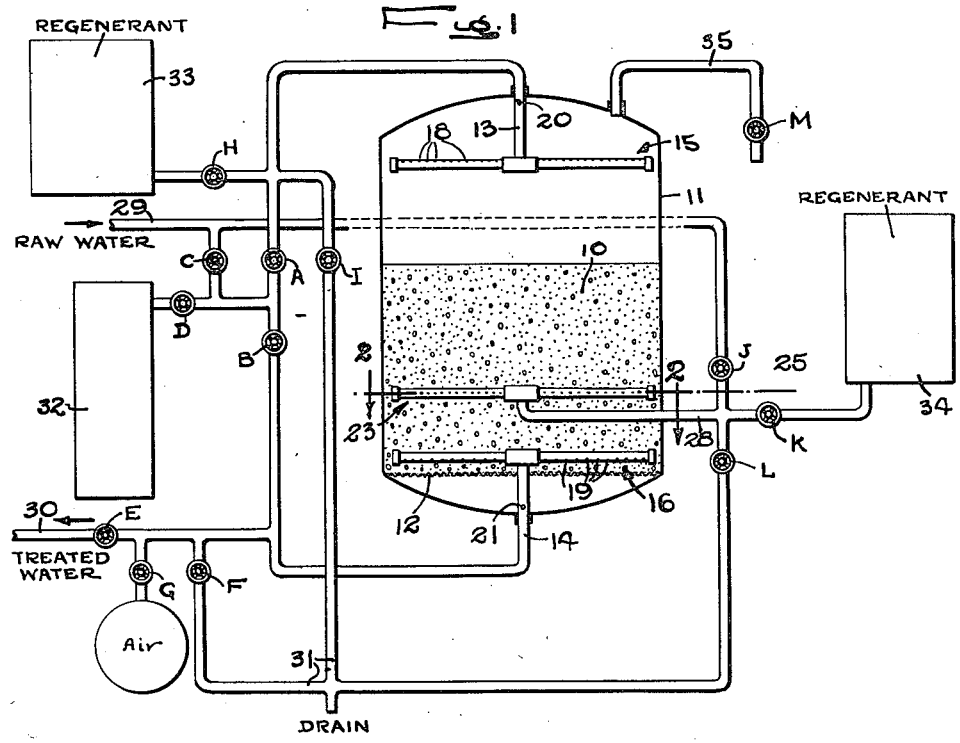

While the invention is susceptible of various modifications and alternative constructions and may be practiced in various ways, we have illustrated in the drawings and will herein describe the preferred embodiment and manner of carrying out the invention. It is to be understood that we do not thereby intend to limit the invention by such disclosure, but aim to cover all modifications, alternative constructions, and methods falling within the spirit and scope of the invention as expressed in the appended claims.

Figure 2:
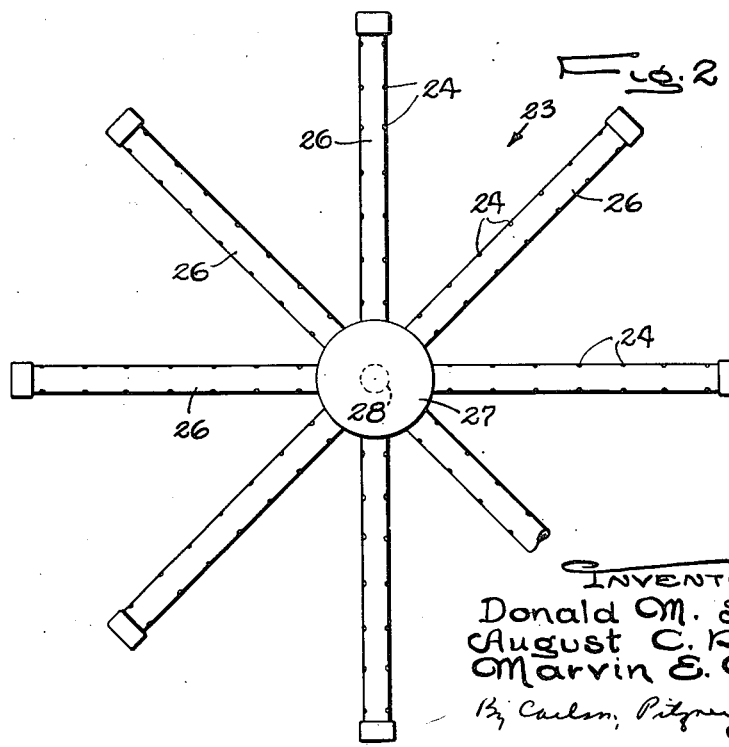
Fig. 2 is a sectional view of one of the distributor heads, the section being taken along the line 2—2 of Fig. 1.

Referring now to the drawings, the purification of water or other liquids to remove both cations and anions may be effected by passing the liquid through a bed 10 comprising both anion and cation exchange materials intermixed to form a substantially homogeneous granular body which is confined in an upright tank 11 and supported on a false perforated bottom or screen 12 or on a layer of inert granular material. A pipe 13, which is the inlet in an exchanger of the downflow type, enters the upper end of the tank, and a similar outlet pipe 14 extends through the lower tank end. These pipes communicate with distributor heads 15 and 16 having openings well distributed over the horizontal cross section of the tank and smaller in size than the granules of the ion exchange materials so as to pass liquid only. If desired, the heads may, as shown in Fig. 2, comprise a series of tubular arms 17 radiating from the inlet or outlet pipe and having holes of suitable shape therein. Preferably, the openings 18 in the upper distributor 15 are in the upper sides of the arms while the holes 19 in the lower distributor face downwardly and are disposed substantially in the plane of the extreme bottom of the resin bed 10. Vent and drain holes 20 and 21 are preferably formed in the pipes 13 and 14 at the extreme top and bottom of the tank chamber.

Any anion exchange material suitable for mixed bed operation may be employed. Amberlite IR–4B having a modified amine active group is one example of a weakly basic anion exchange material which may be used. Where more complete ion removal is desired, the anion exchange material is preferably of the so-called highly basic type in which the active exchange radical is a quaternary ammonium group such as in the materials sold under the trade designations of Nalcite SAR or Amberlite IRA–400. Resins of the latter type have an apparent specific gravity of about .34 gram per cubic centimeter, and are regenerated with a solution, usually about three to ten percent of the hydroxide of an alkali metal such as sodium.

While the cation exchange material may be of the weakly acid type having a carboxylic active group such as Amberlite IRC–50, the more strongly acid type of resin having an active sulphonic group is preferred. Examples of the latter resins are those sold by the designations Amberlite IR–120 and IR–105, Nalcite HCR and MX, and Duolite C–3. These resins have an apparent specific gravity of about .77 gram per cubic centimeter, and are regenerated by a mineral acid such as hydrochloric usually a two to fifteen percent solution.

To facilitate separation of the two exchange materials from each other within the tank 11, the latter is made substantially deeper than the mixed resin bed 10 which preferably occupies one half to two-thirds of the total tank volume.

In order to enable each exchange material, after segregation within the tank, to be subjected to the action of its proper regenerating solution, without danger of contaminating the other material, a third distributor head 23 is disposed within the tank with its openings 24 well distributed over the cross section of the tank substantially in the horizontal plane 25 which is spaced above the effective bottom of the tank a distance equal to the depth of the heavier of the two exchange materials when the latter are separated from each other. The distributor is constructed in the same general manner as the upper and lower distributors 15 and 16 except that the holes 24 are formed in the sides of the distributor arms 26 and are distributed over the entire area of the interface between the layers and all the way to the wall of the tank. The latter communicate at their inner ends with a hub 27 connected to and supported by the inner end of a pipe 28 which projects through the side wall of the tank and is welded or otherwise secured rigidly therein.

Through a system of piping and valves A through L, the pipes 13, 14, and 15 are connectable externally of the tank 11 to a raw water supply pipe 29, a treated water outlet pipe 30, a drain line 31, a source 32 of soft water which may be produced by an ordinary base exchange water softener, a source 33 of solution, in this instance three percent to ten percent sodium hydroxide, for regenerating the anion exchange material, and a source 34 of solution, in this instance two percent to fifteen percent acid, for regenerating the cation exchange material. In addition, the extreme upper end of the tank 11 communicates with a vent pipe 35 controlled by a valve M. The various valves may be of any desired type and adapted for adjustment selectively either manually or automatically to achieve the desired rates of fluid flow as will be described later. Also, the various fluids to be forced through the tank may be placed under the necessary pressure in any desired manner as by pumps, ejectors, or by siphoning or gravitational action.

The apparatus as described above and shown in Fig. 1 is conditioned for service operation by opening the valves A, C, and E, and closing the other valves. As treated water is drawn out of the pipe 30, raw water delivered through the pipe 29 flows into the upper end of the tank and down through the bed 10 of mixed resins by which the anions and cations are removed simultaneously and very completely.

The present invention contemplates regeneration of the two different exchange materials effectually and without removal thereof from the tank 11. The method comprises generally segregating the different resins into two layers 37 and 38 disposed one above the other within the tank, flowing the solutions for regenerating the different materials through the respective layers 37 and 38 without substantial contact between the solution for regenerating one material and the granules of the other, and finally mixing the two regenerated and rinsed materials. As will appear later, the regenerating solutions may be passed through the two layers successively or simultaneously, the excess in each instance being flushed out without contaminating the other resin.

To separate the two materials, advantage is taken of the substantial difference in their specific gravities as set forth above and therefore the different heights to which the granules of the two materials will rise and become suspended in a column of liquid moving upwardly at the proper rate. This is accomplished during backwashing of the exhausted materials, preferably with softened water so as to avoid precipitation of calcium or magnesium hydroxide within the exchanger in subsequent steps of the process. For this purpose, the valves B, D, and I are opened, all others being closed. Softened water from the source 32 then flows upwardly through the tank displacing any air in the upper part thereof so as to form an upwardly moving column of water extending to the top of the tank and overflowing to the drain. The resin granules will thus be washed and agitated so as to become suspended in the water column, the heavier material remaining in the lower portion of the tank while the lighter material is carried to a higher level and thus separated effectually from the heavier material.

With the two materials thus segregated while in suspension, settling thereof to form the two layers 37 and 38 may be effected simply by closing the valve B to discontinue the flow of soft water into the tank. Then the heavier material settles rapidly into a compact lower layer. This is followed by settling of the lighter material forming the upper layer 37 as illustrated in Fig. 3. It has been found in practice that the line of separation of the two resins is quite sharply defined so that by varying the volume of the heavier resin, the plane of abutment of the two layers may be adjusted vertically to bring the dividing line into coincidence with the plane 25 in which the openings 24 in the intermediate distributor are disposed.

Regeneration of the different exchange materials may be effected either simultaneously by flowing the two regenerating solutions vertically through corresponding resins or by contacting one solution with one layer and subsequently flowing the other solution through the other resin. While each regenerating solution is flowing through the corresponding resin layer, a liquid is simultaneously passed vertically through the other resin in a direction such as to block the migration of the solution into the layer of the latter resin thereby minimizing contamination of the latter or loss of the ion exchange capacity thereof. When the two resins are regenerated simultaneously, the regenerating solution for one resin serves as the liquid for blocking the migration of the other solution beyond its resin layer. When the resins are regenerated successively, water may be used conveniently as the blocking liquid.

Considering now the two step regeneration, it is preferable to treat the upper layer 37 first as illustrated in Fig. 4 by opening the valve H to admit solution from the source 33 to the upper distributor 15, opening the valve L to connect the intermediate distributor 23 to the drain, and partially opening the valve B to admit a small flow of soft water through the valve D into the lower distributor 16. The regenerating solution thus flows downwardly through the upper part of the tank and the upper layer 37 and thence out through the intermediate distributor 24. At the same time, soft water flows up through the lower resin layer 38 and out through the distributor 23. The upward flow of water may be at a much lower rate than the rate of downward flow of the regenerating solution, the two rates of flow being correlated with each other so that the excess of the regenerating solution is removed through the distributor but is blocked by the upwardly advancing column of water from migrating into the lower layer 38.

After the required amount of the solution has been forced through the upper bed, the excess of the alkali is flushed out by operating the various valves to cause water to flow downwardly through the upper bed while continuing the upward flow of the blocking liquid or water upwardly through the lower bed.

The lower resin layer 38 is then regenerated by leaving the valve F open, closing the valve A partially until there is only a small flow of soft water therethrough and opening the valve K. As illustrated in Fig. 5, acid regenerant from the source 34 thus enters the tank through the intermediate distributor 23 and flows downwardly through the layer 38 and out through the valve F to the drain. At the same time, the smaller amount of soft water or blocking liquid flowing downwardly from the distributor 15 and through the successive resin layers 37 and 38 becomes mixed with the acid regenerant so as to pass out through the lower distributor with the acid excess. Migration of a substantial amount of acid regenerant upwardly into the previously regenerated anion resin 37 is thus prevented.

The excess acid left in the resin layer 38 after closure of the valve K may be flushed out with raw water by opening the valve J. This water flows downwardly through the layer 38 while the small flow of soft water downwardly through the upper layer is continued. Then the entire unit is flushed out with soft water in an amount substantially equal to the volume of the tank. This is accomplished after closing the valve J by opening the valves A and F. Soft water flows down through the tank and out through the distributor 16.

Preparatory to intermixing of the two regenerated resins, the water above the resin layers is removed. This may be accomplished conveniently after closing the valve A by opening the valve M in the vent line, allowing the desired volume of water to drain out of the tank to a level approximately at the top of the resin layer 37. The drain valve F is then closed. Actual mixing of the resins may be effected in any suitable manner, one convenient way being to introduce compressed air into the tank through the lower distributor 16. To this end, the valve M is left open and the valve G is opened. The granules of the resins are thus agitated vigorously or churned as illustrated in Fig. 7 so that the two materials become mixed together uniformly and remain in this condition after interruption of the air flow and settling of the resins.

Finally, the exchanger is prepared for service use by opening the valve C to admit raw water to the top of the tank until the latter is filled completely. Thereupon the vent valve M is closed and the valve E is opened to connect the lower tank end to the service outlet line 30.

The regeneration procedure may be shortened without substantial sacrifice of efficiency in the use of the solutions by flowing the solutions through the respective resin layers 37 and 38 simultaneously as above described and in opposite directions toward the intermediate distributor head 23. For this purpose, the piping and valving exteriorly of the tank are arranged as shown in Fig. 8 in which the parts corresponding to the apparatus shown in Fig. 1 are indicated by the same reference numerals. In this instance, the regenerating solution 34 for the cation material in the layer 38 is introduced through the lower distributor 16.

In the operation of the modified apparatus, the steps of backwashing and segregating the two resins into the layers 37 and 38 are effected in the same manner as in the process first described. The apparatus is conditioned for introducing the regenerating solutions into the respective resin layers by opening the valve L to connect the distributor 23 to the drain, closing the valves A, B, J, and I and opening the valves H and K to connect the alkali and acid solution supply lines to the upper and lower distributors 15 and 16 respectively. The alkaline solution thus flows downwardly through the layer 37 of anion resin and out through the distributor 23. Simultaneously, the acid solution flows upwardly through the cation resin and out through the intermediate distributor, the openings in which are made large enough to accommodate the combined flow of the two solutions into the tank. Since the solutions flow vertically through the resin layers in opposite directions and meet at the level of the openings 24 in the distributor 23, the alkali solution acts as the liquid above referred to for blocking the migration of the acid into the anion resin 37 while at the same time the acid solution blocks the alkali against passage into the cation resin. Thus, there is no substantial contact between the alkali and the cation resin or between the acid and the anion resin.

Washing of the two resin layers to flush out the excess of alkali and acid is effected by similarly flowing water downwardly and upwardly toward the distributor 23. To accomplish this, the valves H and K are closed, and the valves A, D, and J are opened, the valve L remaining open. Hard water passes through the valve J into the tank by way of the distributor 16 while soft water flows through the valves D and A into the tank through the distributor 15. As in the regeneration operation, the relative flows are adjusted so that the two rinse waters meet in the plane of the distributor openings 24 and thus pass out to the drain without substantial intermixing with each other. Thus, the rinse water for one resin blocks the flow of the rinse water for the other resin into the layer of the first resin.

With both resins now regenerated, the deionizer is conditioned for service in the manner above described in connection with the first process. That is, by manipulation of the valves in proper combinations, air is introduced above the resin layer 37, the two resins are intermixed by agitation with compressed air, and the tank is refilled with water.

It will be apparent from the foregoing that all of the operations necessary for effecting regeneration of the intermixed exchange materials are carried on within the deionizer tank itself without the removal of either of the materials from the tank. This is achieved through the use of the intermediate distributor 23 and its location at the line of abutment between the two layers 37 and 38 which make it possible, in both of the methods described above, to introduce each regenerating solution into one resin layer either at the top or bottom side thereof and withdraw the excess on the opposite side so as to avoid substantial contact between the solution and the other resin. Complete regeneration of each resin may thus be effected thereby achieving optimum exchange capacity of the two resins. At the same time, the regeneration procedure is simplified as compared to that heretofore used in reconditioning mixed bed deionizers in which the different exchange materials are handled separately requiring two tanks and duplicate valve and piping systems.

In addition, the time required for effecting the regeneration is shortened considerably because the final rinsing of the separate resin beds while the two are connected in series is eliminated. This is possible because any trace of either regenerant will be removed automatically by ion exchange action in the initial flow of the liquid to be treated through the bed 10 after remixing of the two materials following regeneration and the short rinse of the individual materials as described above. The period for regeneration is shortened still further when the different exchange materials are subjected to the action of their respective regenerants simultaneously using the apparatus shown in Fig. 8.

The terms "blocking liquid" referred to in the appended claims as submerging one of the separated layers of ion exchange materials while the second layer is being regenerated contemplates a liquid such as water or the regenerating solution for such material which liquid will not appreciably reduce the ion exchange capacity of the material which it contacts. Thus, in the examples given above, the water (Fig. 4) or the acid for regenerating the cation exchange layer 38 (Fig. 8) acts as the blocking liquid during the passage of the alkali solution down through the anion layer 37.

We claim as our invention:

1. In the process of regenerating a mixed-bed column of anion-exchange and cation exchange materials of different densities, the steps of backwashing the exhausted mixed bed upwardly through the column to stratify the bed into an upper layer of the lighter of said exchange materials and a lower layer of the heavier material, regenerating the upper one of said exchange layers by passing a regenerating solution therefor downwardly through the layer, passing water upwardly through said lower layer while said regenerating solution is being passed down through said upper layer whereby to block substantial migration of the regenerating solution into the lower layer, withdrawing from the stratified column the mixture of said regenerant and water as the two meet near the inner ends of said layers, and thereafter passing water downwardly through the upper layer as the upward flow of water through the lower layer and withdrawal of the combined volumes of liquids from the intermediate part of said column is continued.

2. In the process of regenerating a mixed-bed column of anion and cation exchange materials of different densities, the steps of backwashing the exhausted mixed bed by passing water upwardly through the column to stratify the bed into an upper layer of the lighter of said exchange materials and a lower layer of the heavier material, regenerating the upper one of said exchange layers by passing downwardly through such layer a regenerating solution for the material thereof, passing a blocking liquid upwardly through said lower layer during the passage of said regenerating solution through the upper layer whereby to block the migration of the solution into the lower layer, and, during the regeneration of the upper layer, withdrawing the excesses of said regenerating solution and blocking liquid out of the intermediate part of the stratified column adjacent the inner ends of said two layers.

3. In the method of regenerating a mixture of cation and anion exchange materials of different densities in a tank substantially larger than the volume of said materials and having upper and lower terminal openings and an intermediate opening located substantially at the dividing plane of the materials when the latter are segregated, the steps of flowing liquid upwardly through said tank to separate the materials in the liquid according to their relative densities, allowing the materials to settle and form two layers disposed one above the other, forcing acid and alkali regenerating solutions into said tank at the outer ends of the cation and anion layers respectively while simultaneously withdrawing the combined volume of the excess of said solutions from the tank over an area substantially coincident with said dividing plane, and forcing rinse water into the upper and lower ends of the stratified column while continuing the withdrawal of fluid from the tank over said area whereby to remove the excess of said acid and alkali and prevent the excess regenerant for one material from migrating across said dividing plane into the other material.

4. The process of regenerating within a single tank a mixed-bed column of an anion-exchange resin and a cation-exchange resin in which the density of the cation-exchange resin is greater than the density of the anion-exchange resin, which comprises backwashing the exhausted mixed bed by passing water upward through the column in said tank to stratify the bed into an upper layer of anion-exchange resin and a lower layer of cation-exchange resin, regenerating said upper anion layer in contact with the lower layer by passing alkali regenerant downward through the upper layer of anion-exchange resin while simultaneously passing water upwardly through the lower layer of cation-exchange resin, whereby to block substantial migration of the alkali into the lower layer, withdrawing the mixture of excess alkali and water from the column and tank adjacent the inner ends of said layers, separately regenerating said cation resin layer, and finally remixing the regenerated layers within the tank.

5. The process of regenerating within a tank a confined mixed-bed column of an anion-exchange resin and a cation-exchange resin in which the density of the cation-exchange resin is greater than the density of the anion-exchange resin, which comprises backwashing the exhausted mixed bed by passing water upward through the column in said tank to stratify the bed into an upper layer of anion-exchange resin and a lower layer of cation-exchange resin, regenerating said stratified layers in contact with each other by passing alkali regenerant downwardly through the upper layer of anion-exchange resin and simultaneously passing acid regenerant upwardly through the lower layer of cation-exchange resin whereby the oppositely flowing regenerants block the migration of each regenerant into the opposite layer, withdrawing the excess alkali and acid regenerants from the column and tank adjacent the inner ends of said layers, and, after regeneration of the two layers, remixing the regenerated resins within said tank.

6. The process of regenerating within a single tank a mixed-bed column of an anion-exchange resin and a cation-exchange resin in which the density of the cation-exchange resin is greater than the density of the anion-exchange resin, which comprises backwashing the exhausted mixed bed by passing water upward through the column in said tank to stratify the bed into an upper layer of anion-exchange resin and a lower layer of cation-exchange resin, separately regenerating said stratified layers in contact with each other by passing alkali regenerant downward through the upper layer of anion-exchange resin and passing a blocking liquid upwardly through the lower layer of cation-exchange resin whereby to block substantial migration of the alkali into the lower layer, and withdrawing the mixture of the excess alkali and blocking liquid from the column and tank adjacent the inner ends of said layers.

References Cited in the file of this patent

UNITED STATES PATENTS

| | | |
|---|---|---|
| 1,942,807 | Dotterweich | Jan. 9, 1934 |
| 1,942,808 | Dotterweich | Jan. 9, 1934 |
| 2,268,607 | McGill | Jan. 6, 1942 |
| 2,376,543 | Lawlor | May 22, 1945 |
| 2,460,036 | Sebald | Jan. 25, 1949 |
| 2,461,505 | Daniel | Feb. 15, 1949 |
| 2,466,662 | Mindler | Apr. 5, 1949 |

FOREIGN PATENTS

| | | |
|---|---|---|
| 232,041 | Great Britain | Apr. 15, 1925 |